(No Model.)
G. BARTHELS.
MIRROR PLACARD.
No. 506,580. Patented Oct. 10, 1893.
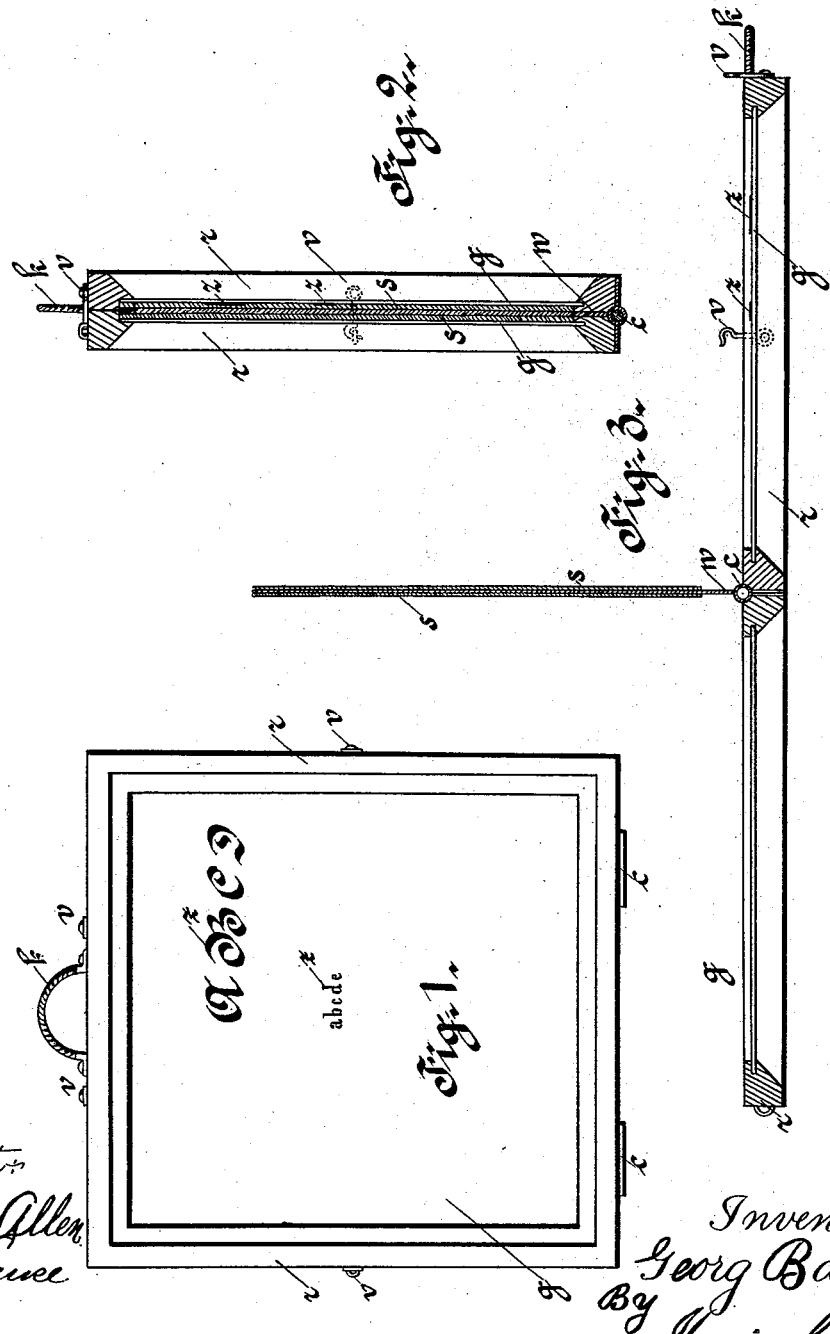

UNITED STATES PATENT OFFICE.

GEORG BARTHELS, OF HAMBURG, GERMANY.

MIRROR-PLACARD.

SPECIFICATION forming part of Letters Patent No. 506,580, dated October 10, 1893.

Application filed September 24, 1892. Serial No. 446,845. (No model.)

*To all whom it may concern:*

Be it known that I, GEORG BARTHELS, of Hamburg, in the Kingdom of Prussia and German Empire, have invented a new and useful Double and Mirror Placard for Reflecting Letters, each of which is reversible independently of the others and reflecting letters in all colors and sizes, of which the following is a specification, reference being had therein to the accompanying drawings.

This invention relates to the production of placard and mirror placard apparatus, comprising the arrangement of loose letters or other signs made of cardboard or other suitable material of even thickness and secured in the desired positions by pressure between a transparent front plate and a nontransparent back plate covered with soft material. The invention is of special advantage in permitting of the rapid production of any desired placard and of its speedy alteration at any time. A back-ground of any desired color may be given by covering the soft backing with colored tissue paper or the like.

The invention is applicable not only for the production of placards intended for direct visual inspection, but also for such as are intended to be read by reflection in a mirror. In the latter case, the letters are obversely placed in the frame which is placed at a suitable angle to the mirror.

On the accompanying drawings, Figure 1 represents a front view of the apparatus. Fig. 2 represents a sectional elevation of the same when closed; and Fig. 3 represents a like view when open.

The improved apparatus consists of two frames $r$, connected by hinges $c$, and provided with fastening devices $v$. The frames inclose or are fitted with glass plates $g$, which are secured at the edges. Between the frames is mounted a partition $w$, of cardboard or other suitable material, which is covered with soft fabric $s$, on each side and is adapted to turn on the hinges $c$.

The letters or signs $z$ are made of cardboard or other suitable material all of even thickness. When arranged on one or the other side of the partition $w$, to form the desired placard, they are retained in their desired relative position by the pressure of the opposite frame $r$. A chain $k$ serves to suspend the apparatus.

I claim—

The combination of the two frames hinged together and having glass plates, the partition secured to the hinges and covered with soft fabric over which the frames fit, and suitable fastenings for the frames adapted to hold them in closed position; substantially as described.

GEORG BARTHELS.

Witnesses:
THERESE BARTHELS,
RUDOLF BARTHELS, Jr.